Oct. 10, 1950  G. D. McCANN  2,525,496
ANALYZER
Filed Sept. 28, 1946  3 Sheets-Sheet 1

WITNESSES:  INVENTOR
 Gilbert D. McCann.
 BY
 ATTORNEY

Oct. 10, 1950  G. D. McCANN  2,525,496
ANALYZER
Filed Sept. 28, 1946  3 Sheets-Sheet 2

WITNESSES:
E. A. McCloskey
E. F. Oberheim

INVENTOR
Gilbert D. McCann
BY
Paul E. Friedemann
ATTORNEY

Oct. 10, 1950        G. D. McCANN        2,525,496
ANALYZER

Filed Sept. 28, 1945        3 Sheets-Sheet 3

$$E = E_1 + E_2 + E_3 = \pm k_1 Z_1 i_1 \pm k_2 Z_1^2 i_1^2 \pm k_3 Z_1^3 i_1^3 \pm \cdots$$

$$f_1(t) = K_1 \frac{d^2 x_1}{dt^2} + K_3 x_1$$
$$f_2(t) = K_1 \frac{d^2 x_2}{dt^2} + k_2(x_1) \frac{dx_1}{dt} + K_3 x_2$$

WITNESSES:
Ed. M. Blakey
E. H. Oberheim

INVENTOR
Gilbert D. McCann.
BY
Paul E. Friedemann
ATTORNEY

Patented Oct. 10, 1950

2,525,496

UNITED STATES PATENT OFFICE 2,525,496

ANALYZER

Gilbert D. McCann, Pittsburgh, Pa., assignor to Westinghouse Electric Corporation, East Pittsburgh, Pa., a corporation of Pennsylvania Application September 28, 1946, Serial No. 700,130

8 Claims. (Cl. 235—61)

This invention relates generally to a method and/or means for electrically ascertaining or determining the response of a physical system to a known set of forcing functions acting thereon, whether such quantities are of a static or transient character.

Fundamentally, the invention is directed to a method and/or means for determining, on the basis of electrical analogy, the response or reaction of a physical system when subjected to a known set of conditions.

More specifically stated, the invention is directed to a method and/or means of electrical analysis of a physical system which provides for the production of electrical quantities indicative of the forcing functions which excite the physical system to be analyzed, which introduces the electrical quantities thus produced into an electrical network or system representing the electrical counterpart of the physical system to be analyzed, according to the electrical analogy of the manner in which the said forcing functions excite the said physical system, and which thereafter ascertains, or provides for the determination of, the electrical reactions in the electrical counterpart of the said physical system.

In this basic concept the present invention is related to a copending application of G. D. McCann and H. E. Criner, Serial No. 564,831, entitled Analyzer, filed on November 23, 1944, and assigned to the same assignee as this invention, now U. S. Patent 2,420,891, granted May 20, 1947.

The said copending application covers generally the methods of analysis by means of electrical analogue and to this end illustrates and discusses the various forms of the invention in its application to numerous problems. While the basic principles of the invention in the said copending application are applicable to systems expressable by linear equations as well as systems expressable by non-linear equations, the disclosure of the said copending application to simplify the illustration is directed primarily in its teachings to the simpler forms of linear systems.

The present invention, utilizing the basic principles of the said copending application, is directed primarily to a method and means of electrical analysis particularly for non-linear functions.

It is a primary object of this invention to provide a system for the electrical analysis of physical problems.

Another object of this invention is to provide a system of the character referred to which is based upon the principles of electrical analogy.

Yet another object of this invention is to provide a system of electrical analysis which is particularly adapted to the solution of problems defined in terms of non-linear functions.

Still another and more specific object of this invention is to provide a system of analysis of the character mentioned which provides for a circuit system or network which in its various parameters and their relation in the circuit is the electrical counterpart of the physical system to be analyzed, which provides for the production of electrical quantities representative of known conditions under which the physical system must operate, to energize said circuit system, which utilizes said electrical quantities in the excitation of said circuit system, and which thereafter provides an indication or a record of the response of the system to said quantities.

A specific object of this invention is to provide a system of analysis of the character referred to which is applicable in the solution of various types of functions expressable in terms of a power series.

Another specific object of this invention is to provide a system of analysis wherein systems defined by sets of simultaneous equations involving non-linear unilateral coefficients or terms may be analyzed.

The foregoing statements are merely illustrative of the various aims and objects of this invention. Other objects and advantages will become apparent upon a study of the following specification when considered in conjunction with the accompanying drawings, in which.

Figure 7:
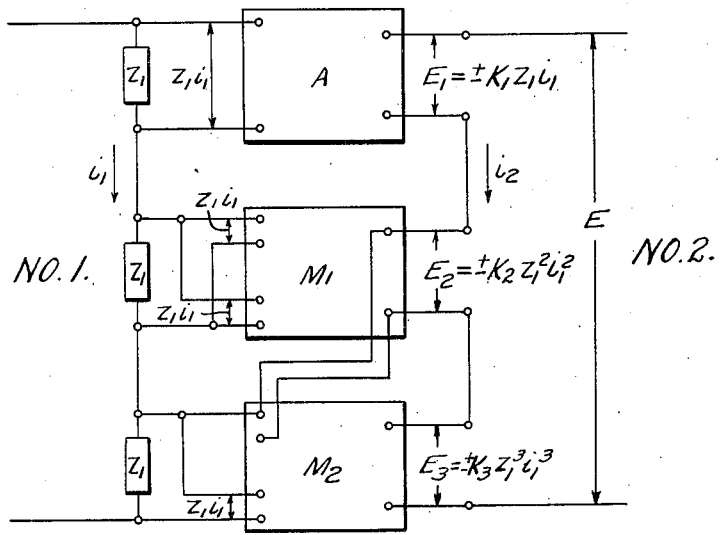
Fig. 7 is a diagrammatic showing of a circuit network based upon the mathematical definition of a non-linear unilateral impedance for producing voltage in one circuit from another circuit, or in the mathematical equation to be solved, the unilateral coefficient.
Figure 8:
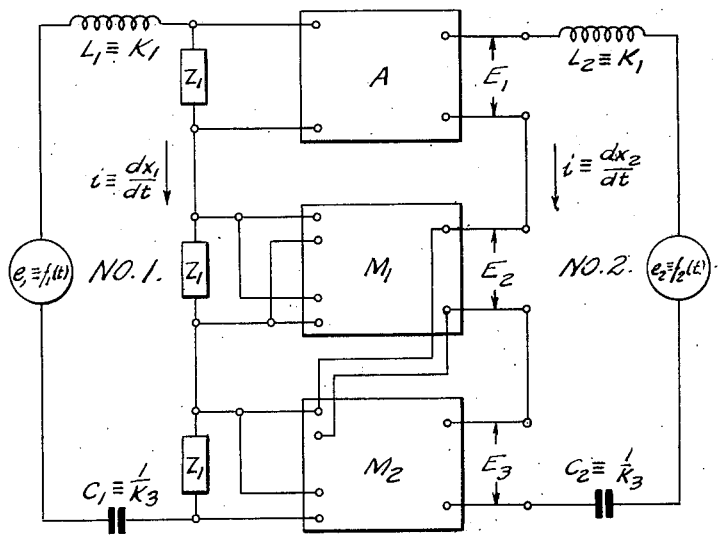

Fig. 8 demonstrates the application of such a system as illustrated in Fig. 7 in a practical problem.

The analyzer of this invention is an electrical analogue type of computer in which the physical system set up to satisfy the mathematical equations defining the system to be analyzed, is comprised of electrical circuits. The algebraic or differential equations defining the physical system to be analyzed are, in the case of linear systems, represented by electric circuit parameters such as resistors, inductors and capacitors. For linear systems involving negative impedances or energy sources, such as required for servomechanisms, that is, any self-regulating system such as a speed controller or angle-position controller, electronic amplifiers are used. Also, as will hereinafter be shown, special electric networks have been developed for basic non-linear functions. Additionally, various types of circuits have been developed, some of which are illustrated in the above-identified copending application, for producing any arbitrary sets of excitation functions and initial or boundary conditions. These, as well as other circuit components, are subjected to a wide range of variation depending upon the mathematical expressions defining the system to be analyzed and the forcing or excitation functions acting thereon. In practice all the functional elements are arranged in such form that they can be quickly connected together to satisfy the equation of the problem to be analyzed.

Further, by way of illustration of the more general considerations involved in the analysis by the system of electrical analogy, it might be well to briefly consider the application of the electrical analogy from the purely mathematical viewpoint using the mechanical-electrical analogy as an example. For a wide range of physical systems, the proper analogous circuit can best be determined by the establishment of a consistent analogy between the variables and constants of electric circuit theory and those of the physical system to be analyzed. This method has been covered in detail in the above-mentioned copending application. As an illustration analogies for mechanical vibratory systems are given in Table I which follows at the end of this paragraph. Familiarity with the analogies frequently permits construction of the analogous circuits without the necessity of completely formulating the mathematical equations and is a great aid in the general analysis of the system.

*Table I.—Four methods of obtaining analogous electrical circuits for mechanical systems*

| Mechanical system | Analogous electrical systems | | | |
|---|---|---|---|---|
| | Mass-inductance circuit | | Mass capacitance circuit | |
| | Voltage (V) = Force or Torque | $\frac{dV}{dt}$ = Force or Torque | Current (I) = Force or Torque | $\frac{dI}{dt}$ = Force or Torque |
| Mass or Inertia | Inductance (L) | Inductance (L) | Capacitance (C) | Capacitance (C). |
| Velocity Damping | Resistance (R) | Resistance (R) | Conductance $\frac{1}{R}$ | Conductance $\frac{1}{R}$ |
| Spring Constant | Susceptance $\frac{1}{C}$ | Susceptance $\frac{1}{C}$ | Inverse Inductance $\frac{1}{L}$ | Inverse Inductane $\frac{1}{L}$ |
| Force or Torque | Voltage (V) | $\frac{dV}{dt}$ | Current (I) | $\frac{dI}{dt}$ |
| Displacement | Charge ($\int I dt$) | (I) | ($\int V dt$) | (V) |
| Velocity | (I) | $\frac{dI}{dt}$ | (V) | $\frac{dV}{dt}$ |
| Acceleration | $\frac{dI}{dt}$ | $\frac{d^2I}{dt^2}$ | $\frac{dV}{dt}$ | $\frac{d^2V}{dt^2}$ |

The choice of analogy depends upon a number of factors. For most transient problems a direct record of the measured variable as a function of time can be more easily obtained with a cathode ray oscilloscope which is essentially a voltage measuring device. Therefore, when possible, it is best to use the analogy for which the desired quantity is proportional to a voltage. Table I thus becomes a guide to determine the most useful analogy.

In setting up an analogous electrical circuit by the relations of Table I, if the impedances and electrical excitation functions, such as the sudden application of voltage are made equal to the mechanical quantities they represent in consistent systems of units, all electrical solutions will be numerically equal to the true mechanical solutions. However, it is desirable to change the electrical circuit constants by a fixed ratio so that it is not necessary to provide an excessively wide range of variations in circuit components in the computing device. Frequently the time base must also be changed for the same reason or so that the solution can be recorded more readily. A consistent set of conversion formula is given in Table II following this paragraph. In practice, it is also usually more convenient to set the electrical variable representing the known excitation function at an arbitrary value and record the solutions as ratios of this by the equations of Table II.

*Table II.—Conversion formula for circuit constants*

| Actual Electric Circuit | Force-Voltage Mass-Inductance Circuit |
|---|---|
| $L' = \dfrac{aL}{n}$ | $L' = \dfrac{aM}{n}$ |
| $C' = \dfrac{C}{an}$ | $C' = \dfrac{1}{ank}$ |
| $R' = aR$ | $R' = aG$ |

Where $a$ is an arbitrary constant, $n$ is the ratio of the frequencies in the analogous circuit to those in the actual system. The $L$'s, $C$'s, and $R$'s are respectively inductance, capacitance, and resistance, while $M$, $G$ and $k$, respectively represent mass, damping characteristics, and spring constant.

(1) If the known excitation function is represented by a voltage $E_0'$, actual voltages or quantities they represent are given by the following equations:

$$e_n = \frac{E_0}{E_0'} e_n' \qquad f_n = \frac{F_0}{E_0'} e_n'$$

and currents or their analogies are represented in the following equations:

$$i_n = \frac{aE_0}{E_0'} i_n' \qquad v_n = \frac{aF_0}{E_0'} i_n'$$

(2) When the known excitation function is represented by currents $I_0'$, then:

$$i_n = \frac{I_0}{I_0'} i_n' \qquad v_n = \frac{V_0}{I_0'} i_n'$$

$$e_n = \frac{I_0}{aI_0'} e_n' \qquad f_n = \frac{V_0}{aI_0'} e_n'$$

The analogous electrical circuits can also readily be developed from the abstract mathematical equations. This may be well illustrated in the method of setting up electrical circuits to represent any set of one or more simultaneous equations. The formation of equations, involving the process of addition, is readily accomplished with electrical circuits. By either of Kirchoff's two laws sets of currents or voltages, representing the equations term by term, can be added and equated. The equation for voltages is more commonly used and will be touched upon here. Each term of the equation can be set up by connecting circuit elements in the proper relationship in an analogy network. Other mathematical process may be required. These include multiplication, division, the formation of integral or differential relations between the dependent and independent variables.

In the more elementary case of linear differential equations with constant coefficients, the formation of the differential relations and multiplication by the constant coefficients of the passive elements are, of course, quite simply formed by the connection in suitable circuit configuration, usually a simple loop circuit for a second order equation, of resistors, inductors and capacitors of proper value. In addition to these circuit elements suitable voltage sources are required capable of producing any arbitrary function of the independent variable, which, in this analogy, is time. With a single loop circuit, as mentioned, only a second order equation can be formed. However, a single equation of any order can usually readily be formed by the addition of loops to form a more complex planar circuit.

In the formation of simultaneous equations involving only passive bilateral mutual coefficients, self-impedance elements can be used for all coefficients. However, for the more complex sets of equations transformers may be required.

For certain types of equations negative coefficients are involved such as negative resistances. These may be self or mutual coefficients. Additionally unilateral coefficients occur.

The extension of hte electrical analogy to nonlinear types of equations involves two additional types of circuit elements. One of these is a multiplying device capable of multiplying any two variable voltages together and giving their instantaneous product. The other device is one capable of producing any arbitrary function of a dependent variable. The latter of the two is the more difficult functional property to obtain for an electrical analogue type of computer when inductors and capacitors are used to form the differential relations. This condition exists because of the relatively high frequencies at which all of the functional elements must operate (60 to 2000 cycles per second). Operation at much lower frequencies would require very large inductors and capacitors.

This difficulty can be overcome by the use of electronic integrators or differentiators. Through the use of properly designed, high gain D. C. amplifiers in the integrating or differentiating circuits the speed of response can be slowed down to a point where a matter of minutes may be involved in obtaining the function. This considerably simplifies the multiplication and representation of both the independent and dependent variables and further makes the selection of a multiplying device simpler since a wider range of types may be employed including the mechanical variety.

The elements for producing arbitrary functions are of three general types all having very low output impedance so as not to disturb the analogous circuit, this being a requirement in the analogy networks based on the force-voltage analogy. Steady state sinusoidal forcing functions are conveniently produced by variable frequency signal generators feeding amplifiers with very low output impedance. Another type of transient excitation function may be produced by a magnetic tape recorder. The magnetic tape is run at slow speed and magnetized in accordance with any predetermined function. It is then run at any arbitrarily selected higher speed through a suitable pickup feeding associated amplification equipment if needed, to generate a voltage proportional to the desired function. In a third type the arbitrary transient function is represented by separate fourier series components generated by discharging a series of capacitors through a suitable circuit network and adding up all the components by introducing all the currents into a common low impedance circuit electrically associated with the analogy circuit. This latter method is disclosed in the copending application hereinbefore mentioned and is more conveniently employed when the excitation function is given in terms of components as their addition and plotting is not required.

Figure 2:
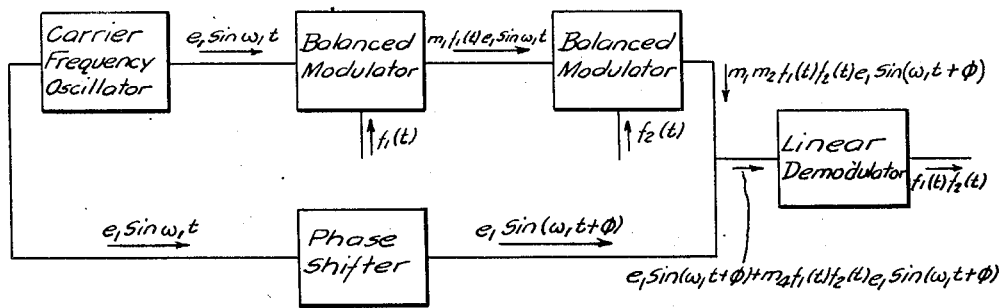
Fig. 2 is a diagrammatic showing of a preferred type of multiplying device.
Figure 3:
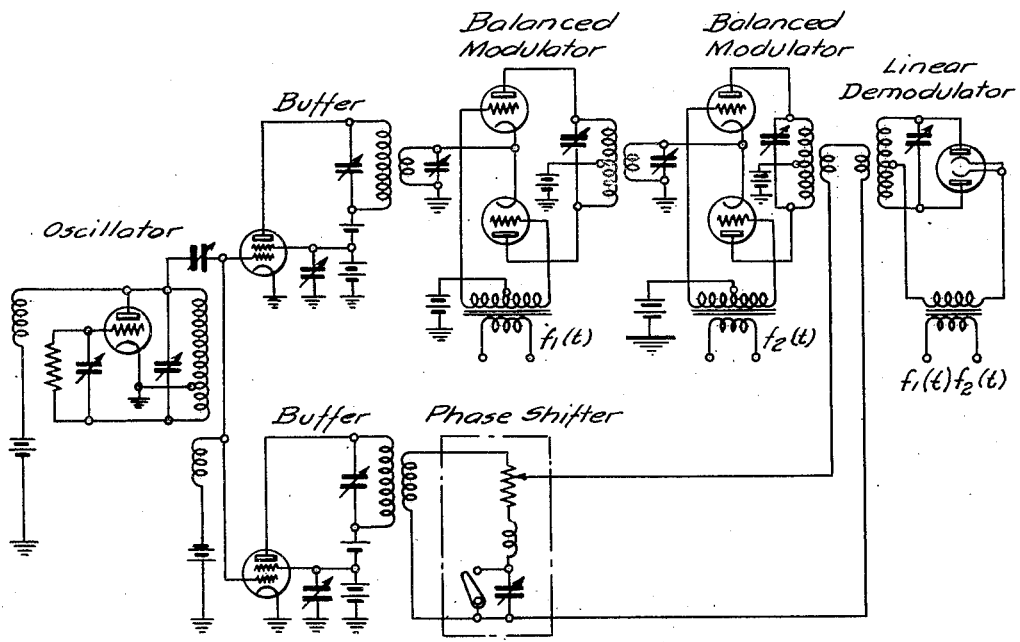
Fig. 3 is a schematic diagram, detailing the circuit connections of the multiplier of Fig. 2.

Various types of multiplying devices have been considered for producing the product quantities appearing in some types of functions. At the present time, there are three types which are known to be feasible for this application. One is a magnetic oscillograph wattmeter element reflecting light on a photocell so arranged that it puts out a current proportional to the angular deflection of the wattmeter element. This angular deflection is proportional to the product of the currents in each of the two coils of the element. The second type of multiplier is a well known rectox circuit used for single side band carrier. The third type and the one which is presently preferred is illustrated in Figs. 2 and 3 of the drawing. This subject matter is covered in a copending application of R. C. Cheek, Serial No. 32,281, filed June 11, 1948, now Patent No. 2,519,223, entitled Multiplier and assigned to the same assignee as this invention. While the subjects matter of Figs. 2 and 3 per se, form no part of this invention, it is herein presented that a better understanding of the present invention may be had.

Figure 1:
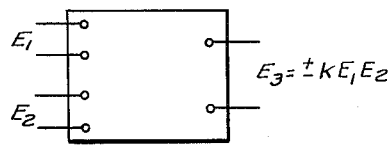
Fig. 1 is a block diagram illustrating in a general way an electrical multiplying device.

As illustrated in elementary form in Fig. 1, the purpose of the multiplier in the electrical analogue type of computer is to form the product of two electrical quantities. The illustration is made in connection with a pair of voltages $E_1$ and $E_2$ applied across separate sets of input terminals, the product appearing across the output terminals being $\pm kE_1E_2$, in which expression $\pm k$ represents the amplification factor of the amplifier. It is required that the multiplier be relatively free of errors due to undesirable orders of curvature in the characteristics of the circuit elements employed.

Previously suggested circuits have been based on direct multiplication of the two input functions in vacuum tube circuits with supposedly square law characteristic curves. Although some available vacuum tubes have characteristic curves approaching the desired parabolic shape, third and higher orders of curvature are present in all in a sufficient magnitude to introduce an undesirable amount of distortion and inaccuracy in the resulting product.

In the embodiment of Figs. 2 and 3, instead of being multiplied directly, the two quantities are multiplied in turn by an auxiliary or carrier wave of a frequency which is high in comparison with the highest frequency component of the expected product. The use of the carrier wave in this manner permits spurious outputs due to undesired orders of curvature in the tube characteristics to be largely eliminated by conventional tuned circuits, which are tuned to the order of frequency of the true product of the input functions by the carrier wave. Spurious responses appear as harmonics of the carrier frequency and as harmonics and intermodulation products of the components of the input functions and are by-passed by the tuned circuits, since they are of an entirely different order of frequency.

After the carrier wave is multiplied in turn by each of the input functions, the carrier wave is eliminated by a process of demodulation in a linear demodulator to which the product of the carrier wave and the input functions, plus an additional carrier frequency wave of the proper phase position, is supplied. The resulting output is the product of the two input functions alone.

In Fig. 2, the oscillator produces the carrier frequency wave, $e_c \sin \omega_1 t$. This wave is fed into a balanced modulator, one of the input functions $f_1(t)$ being used as the modulating signal. The output of the first balanced modulator is $m_1 f_1(t) e_1 \sin \omega_1 t$ which is the product of the original carrier wave and the first input function $f_1(t)$ and the quantity $m_1$ is a constant.

The output of the first balanced modulator is of the same order of frequency as the original carrier wave, and is used as the carrier wave in the second balanced modulator, to which the second input function $f_2(t)$ is supplied as the modulating signal. The resulting output which again is proportional to the product of the modulating function by the carrier wave itself suppressed, is $m_1 m_2 f_1(t) f_2(t) e_1 \sin \omega_1 t$.

It can be seen that the output of the second balanced modulator is proportional to the output that would be obtained from a single balanced modulator if the product of the two input functions $f_1(t) f_2(t)$ had been used as a modulating signal. Furthermore, if a carrier wave of the proper phase position and of peak amplitude greater than the peak amplitude of the output of the second modulator is added to the output of the second modulator, a resulting wave will be obtained which will be of the form $$m_3 e_1 \sin \omega_1 t + m_1 m_2 f_1(t) f_2(t) e_1 \sin \omega_1 t$$

which can be expressed as $$e_1(1 + m_4 f_1(t) f_2(t)) \sin \omega_1 t$$

which is identical in every way to an amplitude-modulated carrier wave, modulated by the product of two input functions.

The phase shifting circuit having output $$e_1 \sin (\omega_1 t + \phi)$$

acting on the output of the second balanced modulator introduces a phase shift $\phi$ to the said output, which may then be written $$m_1 m_2 f_1(t) f_2(t) e_1 \sin (\omega_1 t + \phi)$$

When the outputs of the second balanced modulator and the phase shifter are combined in the input to the linear demodulator the result may be expressed as $$e_1 \sin (\omega_1 t + \phi) + m_4 f_1(t) f_2(t) e_1 \sin (\omega_1 t + \phi)$$

As shown in the block diagram, therefore, the wave resulting from the addition of the original carrier wave, shifted in phase to compensate for any constant phase shift occurring in the modulator circuits and the output of the second modulator, are applied to the linear demodulator or detector of a type conventionally used in the demodulation of amplitude-modulated waves. The output of the demodulator is thus $f_1(t) f_2(t)$.

The schematic diagram of Fig. 3 is based upon the block-diagram of Fig. 1. The various components or stages of the multiplier carry legends corresponding to those of Fig. 2 and it is believed that this schematic diagram will be understood in connection with the discussion previously made. The buffer stages are provided primarily to prevent the feedback of quantities which might disturb the operation of the oscillator. These may be considered part of the oscillator. The phase shifter may be of any conventional type which will provide a range of variation in the phase of the carrier signal from zero to 180 degrees. For a more detailed discussion of the system of Figs. 2 and 3, reference may be had to the above-identified copending application of R. C. Cheek.

Now this invention is concerned with systems for the production of electrical quantities representative of non-linear functions and the use of such systems in the electrical analogue type of computer or analyzer hereinbefore generally discussed, the specific object being to provide a suitable method and means for analyzing several very important classes of non-linear problems which are so difficult to solve by conventional mathematics that they can not be adequately treated.

By way of example, reference may be made to problems existing in non-linear circuits these include the analysis of circuits with saturable reactors, transformer inrush current problems and the analysis of circuits with non-linear resistors to mention a few By the various electrical analogies to other physical systems such as mechanical vibrating systems, heat flow, etc., the non-linear elements of these other systems can be represented by suitable electrical components and the range of application thereby extended.

An arbitrary function which might represent the variation of an impedance with the current flowing through it (or the voltage across it) can be represented to sufficient accuracy by a finite number of terms of a power series. In most instances, two or three terms of the power series are sufficient for practical purposes.

To illustrate this consider the problem of the non-linear resistor mentioned above, whose variation with the current flowing through it is defined by the equation $$R(i) = R_0(1 \pm a_1 i \pm a_2 i^2 \pm a_3 i^3 \pm \ldots) \quad (1)$$

The voltage across such a resistor is $$E = R(i)xi = R_0 i \pm R_0 a_1 i^2 \pm R_0 a_2 i^3 \pm R_0 a_3 i^4 = \ldots) \quad (2)$$

Figure 4:
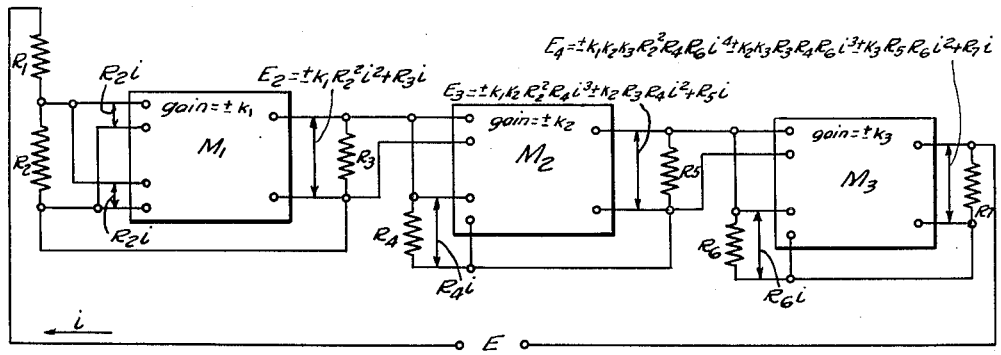
Fig. 4 is a diagrammatic showing of a circuit network for developing electrical quantities representative of the mathematical definition of a particular type of self-impedance or more generally self-coefficients of a mathematical equation.

The system that will represent this self-impedance is shown in Fig. 4 and it is arranged to represent the power series of Equation 2 above term by term. The circuit network includes the three multipliers $M_1$, $M_2$ and $M_3$ which may each be of the type specifically referred to in Figs. 2 and 3, and for the purpose of this illustration let it be assumed that a current $i$ is circulated in the network from an external circuit. Such a circuit may form a part of the complete network including such analogy circuit as may be necessary for the particular problem to be considered and to which the voltage E is to be applied. This will be considered hereinafter. The multipliers are connected in a circuit network so that the output of the first is applied to the second and so on and the network may be extended to include any number of terms of a power series, within practical limits of course. Resistors $R_3$, $R_5$ and $R_7$, respectively connected across the outputs of multipliers $M_1$, $M_2$ and $M_3$ may or may not be utilized in the circuit connections. They may be considered to represent the output impedance of the respective amplifiers or as being physically connected in the manner illustrated. Their use will depend upon the circuit constants needed for proper performance or to form the desired constants of the individual terms of the power series.

Considering first the case in which the resistance of the various resistors indicated is appreciable and may not be neglected, the first voltage is produced by the current $i$ flowing in the circuit loop including resistors $R_1$, $R_2$, $R_3$, $R_4$, $R_5$, $R_6$ and $R_7$. Thus the first voltage $E_1$ may be written $$E_1 = (R_1 + R_2 + R_3 + R_4 + R_5 + R_6 + R_7)i$$

The second voltage appears across the output of multiplier $M_1$ which multiplies the voltage drop across resistor $R_2$ caused by the current $i$ and which is applied to each of its two input terminals as indicated. The product voltage is, therefore $\pm k_1 R_2^2 i^2$ and the second voltage considering the drop across $R_3$ caused by current $i$ thus becomes $$E_2 = \pm k_1 R_2^2 i^2 + R_3 i$$

This voltage is impressed across the upper pair of input terminals of multiplier $M_2$. The current $i$ flowing through the resistor $R_4$ produces a voltage drop expressed by $R_4 i$ which is applied to the lower pair of input terminals on the multiplier $M_2$ and the third voltage $E_3$ becomes $$E_3 = \pm k_1 k_2 R_2^2 R_4 i^3 \pm k_2 R_3 R_4 i^2 + R_5 i$$

In a similar manner, the product of voltages $E_3$ and $R_6 i$ which are respectively applied to the input terminals of multiplier $M_3$ and which forms the fourth voltage of the series, is expressed as a voltage $E_4$ which is $$E_4 = \pm k_1 k_2 k_3 R_2^2 R_4 R_6 i^4 \pm k_2 k_3 R_3 R_4 R_6 i^3 \pm k_3 R_5 R_6 i^2 + R_7 i$$

The voltage E may now be written upon collecting the terms as $$E = (R_1 + R_2 + R_3 + R_4 + R_5 + R_6 + R_7)i \pm (k_1 R_2^2 \pm k_2 R_3 R_4 \pm k_3 R_5 R_6)i^2 \pm (k_1 k_2 R_2^2 R_4 \pm k_2 k_3 R_3 R_4 R_6)i^3 \pm k_1 k_2 k_3 R_2^2 R_4 R_6 i^4 \quad (3)$$

in which the constant $$(R_1 + R_2 + R_3 + R_4 + R_5 + R_6 + R_7)$$

corresponds to the constant $R_0$ of Equation 2 above; the constant $$(k_1 R_2^2 \pm k_2 R_3 R_4 \pm k_3 R_5 R_6)$$

corresponds to the constant $R_0 a_1$ in (2), etc. It should be noted that $R_2$, $R_4$ and $R_6$ may be only one resistor as all voltages may be taken from the single resistor $R_2$ under certain conditions. The constants may be lumped in which case:

$$E = K_1 i \pm K_2 i^2 \pm K_3 i^3 \pm K_4 i^4 \pm \ldots$$

Considering now the case wherein the output impedances of the various multipliers is sufficiently low to be neglected, the terms of the power series involving $R_3$, $R_5$ and $R_7$ will be dropped and the element voltages representing the power series term by term may be written as follows:

$$E_1 = (R_1 + R_2 + R_4 + R_6)i$$
$$E_2 = \pm k_1 R_2^2 i^2$$
$$E_3 = \pm k_1 k_2 R_2^2 R_4 i^3$$
$$E_4 = \pm k_1 k_2 k_3 R_2^2 R_4 R_6 i^4$$

then $$E = (R_1 + R_2 + R_4 + R_6)i \pm k_1 R_2^2 i^2 \pm k_1 k_2 R_2^2 R_4 i^3 \pm k_1 k_2 k_3 R_2^2 R_4 R_6 i^4 \pm \ldots$$

or $$E = K_1 i \pm K_2 i^2 \pm K_3 i^3 \pm K_4 i^4$$

If $R_2$, $R_4$ and $R_6$ are also sufficiently small to be neglected as may be the case if the multiplier gain is sufficiently high then the element voltages $R_2 i$, $R_4 i$ and $R_6 i$ may be dropped and the voltage E represented by $$E = R_1 i \pm k_1 R_2^2 i^2 \pm k_1 k_2 R_2^2 R_4 i^3 \pm k_1 k_2 k_3 R_2^2 R_4 R_6 i^4 \pm \ldots$$

which may also be written $$E = K_1 i \pm K_2 i^2 \pm K_3 i^3 \pm K_4 i^4 \pm \ldots$$

To illustrate the application of the network of Fig. 4, consider the differential equation $$f(t) = k_1 \frac{d^2 x}{dt^2} + k_2(x) \frac{dx}{dt} \quad (4)$$

where, to continue the discussion in terms of the illustration of Fig. 4, $$k_2(x) \frac{dx}{dt}$$

will be assumed to represent the non-linear characteristic of the resistor and $k_2(x)$ being defined by $$k_2(x) = R(i) = R_0(1 \pm a_1 i \pm a_2 i^2 \pm a_3 i^3 \pm \ldots)$$

Then setting $$i \equiv \frac{dx}{dt}$$

$$k_2(x) \frac{dx}{dt}$$

may be written $$k_2(x) \frac{dx}{dt} \equiv R(i)xi = R_0 i \pm R_0 a_1 i^2 \pm R_0 a_2 i^3 \pm R_0 a_3 i^4 \pm \ldots$$

Figure 5:
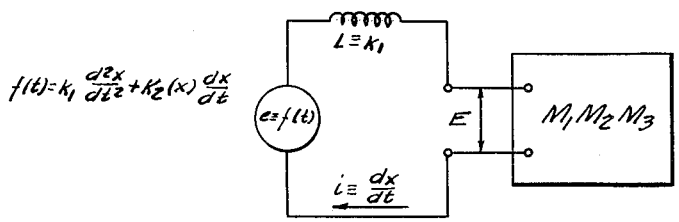
Fig. 5 is a diagrammatic showing of a circuit network applying the principles of Fig. 4 in the solution of a specific example.

The circuit for solving Equation 4 is shown in Fig. 5 in which the network of Fig. 4 is represented as a block designated $M_1M_2M_3$. In this analogy, the first term of Equation 4, $$k_1 \frac{d^2x}{dt^2}$$

is represented in the inductor L, the inductance of which is proportional to $k_1$ as indicated. This is arranged in conjunction with the network $$M_1M_2M_3$$

to form a simple loop circuit excited by a voltage $e$ which is proportional to $f(t)$ and the current $i$ is proportional to $$\frac{dx}{dt}$$

as shown above. This current circulates through the analogy circuit flowing through the multiplier network as indicated in Fig. 4 and produces the various functions across the resistors which are multiplied in the multiplying components of the network, together with other quantities embodied in the power series defining the voltage of Equation 3. The voltage $e$ used to excite the system may be produced by any of the methods generally discussed earlier in this disclosure and may represent a single or a multiplicity of components or other type of variable depending upon the character of the function to be represented.

Figure 6:
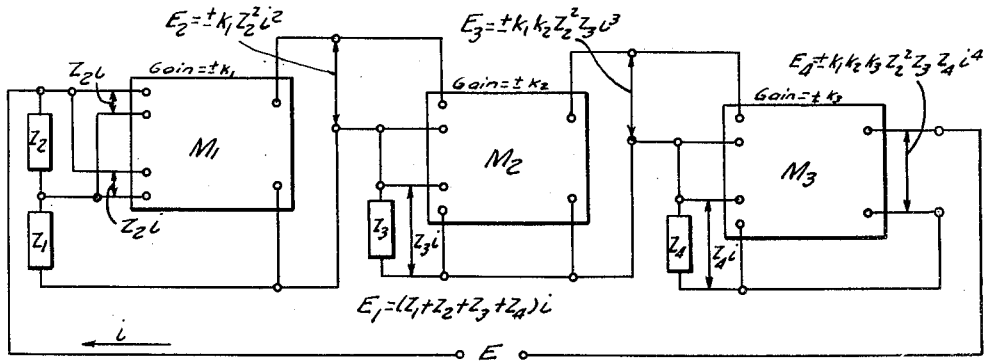
Fig. 6 is a diagrammatic showing of a circuit network for representing any type of self-impedance or self-coefficient in an algebraic or differential equation.

A circuit for representing any other type of self-impedance is shown in Fig. 6. Here the output impedance of the multipliers is presumed to be low, and is therefore neglected. It will be noted that the general circuit arrangement corresponds to that illustrated in Fig. 4. Thus again the circuit network provides for the term by term representation of a power series in terms of voltages. In some cases, the impedances $Z_2$, $Z_3$, and $Z_4$ may have to be negligibly small for the first term of the equation. This can be taken care of to a large extent by a proper control or selection of the amplification of the multipliers. If conditions permit all the impedances may be the same in which case $Z_1$, $Z_3$ and $Z_4$ may be eliminated and voltages for the associated multiplier input terminals may be obtained from $Z_2$. Under other conditions, the various impedances may be of different type, in which case some may be:

$$R\frac{dq}{dt} \text{ or } Ri$$

others may be $$L\frac{d^2q}{dt^2} \text{ or } L\frac{dI}{dt}$$

or $$\frac{1}{c}q \text{ or } \frac{1}{c}\int i dt$$

While not so illustrated it will be understood that it is contemplated employing networks of the general type disclosed in Fig. 6 in circuit systems analogous to those of Fig. 5. It will, therefore, be seen that the current $i$ indicated in the showing of Fig. 6 will be applied from some type of external circuit embodied in the complete electrical solution or analysis of a particular problem.

If the impedances $Z_2$, $Z_3$ and $Z_4$ are appreciable and may not be neglected the voltage appearing across the circuit terminals of the network of Fig. 6 will be expressed as $$E = (Z_1+Z_2+Z_3+Z_4)i \pm k_1Z_2^2i^2 \pm k_1k_2Z_2^2Z_3i^3 \pm k_1k_2k_3Z_2^2Z_3Z_4i^4$$

If $Z_2$, $Z_3$ and $Z_4$ are sufficiently small to be neglected then $$E = \pm Z_1i \pm k_1Z_2^2i^2 \pm k_1k_2Z_2^2Z_3i^3 \pm k_1k_2k_3Z_2^2Z_3Z_4i^4$$

In each case E will be proportional to some non-linear property of a particular problem to be investigated as defined by the equation representing that problem.

In the mathematical analysis of certain problems terms frequently appear in the equations involving non-linear unilateral coefficients. This condition exists in the following typical set of simultaneous Equations (5) and (6)

$$f_1(t) = k_1\frac{d^2x_1}{dt^2} + k_3x_1 \qquad (5)$$

$$f_2(t) = K_1\frac{d^2x_2}{dt^2} + K_2(x_1)\frac{dx_1}{dt} + K_3x_2 \qquad (6)$$

in which $K_2(x_1)$ is assumed to be a non-linear function and is termed a non-linear unilateral coefficient since it appears in Equation (6) only, the term $$K_2(x_1)\frac{dx_1}{dt}$$

as the subscripts indicate resulting in the system defined by Equation (6) from some effect of the system defined by Equation (5). This non-linear term can be represented in a network for producing a non-linear unilateral impedance designed to effect a voltage in one circuit from another circuit, an example being had in the illustration of Fig. 7 which considers first the problem of producing the non-linear unilateral impedance, the complete electrical solution of the set of simultaneous Equations (5) and (6) being set forth in Fig. 8.

Let it be assumed that the coefficient $K_2(x_1)$ may be expressed as $$K_2(x_1) = \pm k_1Z_1 \pm k_2Z_1^2X_1 \pm k_3Z_1^3x_1^2 \pm \ldots$$

and further assume that the term $$K_2(x_1)\frac{dx_1}{dt}$$

is to be represented as a voltage to be produced. Then by the analogy the current to be circulated in circuit No. 1 of Fig. 7 will be proportional to $$\frac{dx_1}{dt}$$

Therefore, $$K_2(x_1)\frac{dx_1}{dt} \equiv E = \pm k_1Z_1i_1 + k_2Z_1^2i_1^2 + k_3Z_1^3i_1^3 \pm \ldots$$

Assuming now that the current $i_1$ is being supplied to circuit No. 1 from a circuit representing another portion of the analogy, it will be seen that across each of the three impedances $Z_1$ a voltage drop will occur which is equal to $Z_1i_1$. One such voltage is applied to the input terminals of amplifier A whose output thus becomes $$\pm K_1Z_1i_1$$

where $\pm K_1$ represents the amplification factor. This it will be noted is a voltage say $E_1$ representing the first term of the power series defining the total voltage E and is applied to circuit No. 2. The quantity $Z_1i_1$ is applied to both input terminals of multiplier $M_1$ and, hence, the voltage $E_2=\pm K_2Z_1^2i_1^2$ and represents the second term of the power series. $E_2$ is also applied to circuit No. 2. In producing the remaining term of the power series, the quantity $\pm K_2Z_1^2i_1^2$ is applied to one set of input terminals of multiplier $M_2$ while the quantity $Z_1i_1$ is applied across the remaining set of input terminals. The output of multiplier $M_2$ thus becomes $\pm K_3Z_1^3i_1^3$ which equals $E_3$. The sum of the voltages around the loop of circuit No. 2 is thus equal to E in view of the term by term representation of the power series in the various voltages produced.

It is to be understood that the circuit network of Fig. 7 may be subjected to change to fit particular problems. It may be extended or decreased to provide more or fewer terms of a power series. The inputs to the various multipliers may be rearranged to provide substantially any desired type of input function and for this purpose need not in all cases be directly connected into the circuit No. 1 as indicated. If the three impedances designated $Z_1$ are of similar character and impedance requirements of circuit No. 1 and the input requirements of the multipliers and amplifier permit, the impedances may be lumped and suitable voltages taken therefrom to be applied to the multiplier and amplifier, the main consideration being the basic circuit configuration to produce the desired arbitrary function, which in this illustration is represented in voltages, in circuit No. 2.

The complete solution of the set of simultaneous Equations (5) and (6) appears in Fig. 8 wherein circuits No. 1 and No. 2 are completed to respectively represent all the remaining terms of Equations (5) and (6). The loop of circuit No. 1 is completed by the addition of the inductor $L_1$, the capacitor $C_1$ and the voltage producing source $e_1$, in which:

$$L_1 \equiv k_1$$
$$C_1 \equiv \frac{1}{k_3}$$
$$e_1 \equiv f_1(t)$$

The loop circuit No. 2 is completed by the addition of an inductor $L_2$, a capacitor $C_2$ and a voltage producing source $e_2$, in which:

$$L_2 \equiv K_1$$
$$C_2 \equiv \frac{1}{K_3}$$
$$e_2 \equiv f_2(t)$$

The excitation functions represented in the voltages $e_1$ and $e_2$ may be of any arbitrarily selected value in compliance with the constant of proportionality selected for the analogy and represent the known forces to which the system to be analyzed is subjected.

In Equation (5) the first term of the right-hand member is represented by the voltage drop across the inductor $L_1$ and the remaining term is represented by the voltage on the capacitor $C_1$.

In Equation (6) the first term of the right-hand member is represented by the voltage drop across the inductor $L_2$. The second term is represented by the voltage produced in circuit No. 2 by the amplifier and multiplier network and the remaining term is represented by the voltage across capacitor $C_2$.

Referring to circuit No. 1 of Fig. 8 it will be noted that the current $i_1$ which is proportional to $$\frac{dx_1}{dt}$$

flows through the impedances $Z_1$ in that circuit loop. Since this current flowing through the impedances will produce voltages in the No. 1 circuit loop which will appear as an additional term, it is essential, for this particular problem, that the impedances $Z_1$ be sufficiently small that the voltages produced thereacross may be neglected when the terms of Equation (1) are being calculated. Thus the input impedances of the amplifier and multipliers must be very low and it will be necessary in most cases to provide a fair amount of gain thereacross to produce output voltage. It has been possible to do this thus far by conventional means.

Likewise to avoid disturbing the operation of circuit No. 2 the output of the amplifier and multiplier network must be of low impedance. If, for some reason, it is found that the amplifier and multiplier network cannot be made of sufficiently low impedance to meet the circuit requirements, the output impedance may be bucked out by the use of a negative impedance such as an amplifier.

In the solution of various physical problems by the method of electrical analogy considerable variation in the basic circuits is usually required. However, this has been shown in this disclosure by the various illustrations which demonstrate the underlying principles involved by means of a few specific examples. The setting up of a problem for solution by the analogy method requires a consideration of the mathematics and circuit theory involved as well as knowledge of the physical systems of each field of engineering to which the method is to be applied. For this reason, it is intended that the foregoing disclosure be considered only illustrative and not interpreted in a limiting sense. The only limitations are to be determined from the scope of the appended claims.

I claim as my invention:

1. Apparatus for electrically representing a plurality of terms of a power series comprising, in combination, a plurality of electrical multiplying devices each having two pairs of input terminals to which the functions to be multiplied are applied and a pair of output terminals, circuit means connecting the output terminals of the first multiplier to one pair of input terminals of the second multiplier and connecting the output terminals of the second multiplier to one pair of input terminals of the third multiplier, and so on, a resistor network, means for exciting said resistor network, circuit means connecting said resistor network with said multiplying devices to apply at least a portion of the voltage drop therein to both pairs of input terminals of said first multiplying device and to the remaining pairs of input terminals of the remaining multiplying devices, said resistor network producing a voltage representative of the first term of said power series, said first multiplying device producing a voltage representative of the second term of the power series and so on.

2. Apparatus for electrically representing a plurality of terms of a power series comprising, in combination, a plurality of electrical multiplying devices each having two pairs of input terminals to which the functions to be multiplied are applied and a pair of output terminals, circuit means connecting the output terminals of the first multiplier to one pair of input terminals of the second multiplier and connecting the output terminals of the second multiplier to one pair of input terminals of the third multiplier and so on, a resistor network, means for exciting said resistor network, circuit means connecting said resistor network with said multiplying devices to apply at least a portion of the voltage drop therein to both pairs of input terminals of said first multiplying device and to the remaining pairs of input terminals of the remaining multiplying devices, said resistor network producing a voltage representative of the first term of said power series, said first multiplying device producing a voltage representation of the second term of the power series, and so on to the last multiplying device employed, and circuit means forming a part of the circuit system for said multiplying devices and said resistor network for combining the voltages of said resistor network and said multiplying devices according to the mathematical signs connecting the terms of said power series.

3. Apparatus for electrically representing a plurality of terms of a power series which comprises, an electrical network, a plurality of impedance elements forming a part of the network, means for exciting the network, a plurality of multiplying devices connected in the network, the first to have applied thereto a pair of voltages appearing across at least a portion of the said impedance elements, the second multiplying device having applied thereto the output of the first multiplying device and a voltage developed in said impedance network and so on to the last multiplying device, the voltage of said impedance network producing the first term of said power series, the output voltage of the first multiplying device producing the second term of the power series and so on to the last multiplying device.

4. Apparatus for electrically representing a plurality of terms of a power series which comprises, an electrical network, a plurality of impedance elements forming a part of the network, means for exciting the network, a plurality of multiplying devices connected in the network, the first to have applied thereto a pair of voltages appearing across at least a portion of the said impedance elements, the second multiplying device having applied thereto the output of the first multiplying device and a voltage developed in said impedance network and so on to the last multiplying device, the voltage of said impedance network producing the first term of said power series, the output voltage of the first multiplying device producing the second term of the power series and so on to the last multiplying device, and circuit means forming a part of the said electrical network for combining the said voltages to form a single voltage according to the mathematical signs connecting the terms of the said power series.

5. Apparatus for electrically representing a set of simultaneous equations, one of which involves a non-linear unilateral term which term is expressable in at least two terms of a power series comprising, in combination, a first circuit including electrical elements representing term by term the equation without the non-linear unilateral term, a second circuit including electrical elements representing term by term the equation having the non-linear unilateral term excepting the non-linear unilateral term, excitation means for supplying a current to said first circuit, excitation means for supplying a current to said second circuit, impedance means electrically connected in said first circuit to be energized in dependence of the current flowing therein, voltage amplification means electrically connected to said impedance means to be energized in dependence of the voltage thereof, and having the output thereof electrically connected in said second circuit, the output voltage of said voltage amplification means representing the first term of said power series, electrical voltage multiplying means having two input circuits and one output circuit, circuit means electrically connecting both input circuits to said impedance means, circuit means electrically connecting said output circuit in said second circuit, the output voltage of said voltage multiplying means being the product of the voltages at the input circuits thereof and representing the third term of said power series.

6. Apparatus for electrically representing a set of simultaneous equations, one of which involves a non-linear unilateral term which term is expressable in at least three terms of a power series comprising, in combination, a first circuit including electrical elements representing term by term the equation without the non-linear unilateral term, a second circuit including electrical elements representing term by term the equation having the non-linear unilateral term excepting the non-linear unilateral term, excitation means for supplying a current to said first circuit, excitation means for supplying a current to said second circuit, impedance means electrically connected in said first circuit to be energized in dependence of the current therein, voltage amplification means electrically connected to said impedance means to be energized in dependence of the voltage thereof and having the output thereof electrically connected in said second circuit, the output voltage of said voltage amplification means representing the first term of said power series, a first electrical voltage multiplying device having two input circuits and an output circuit, circuit means electrically connecting both input circuits to said impedance means, circuit means connecting said output circuit in said second circuit, the output voltage of said first voltage multiplying device being the product of the voltages at the input terminals thereof and representing the second term of said power series, a second voltage multiplying device having two input circuits and an output circuit, circuit means electrically connecting one of said input circuits of said second voltage multiplying device to said impedance means, circuit means electrically connecting the remaining input circuit of said second voltage multiplying device to the output terminals of said first voltage multiplying device, circuit means electrically connecting the output circuit of said second voltage multiplying device in said second circuit, the output voltage of said second voltage multiplying device being the product of the voltage at the input terminals thereof and representing the third term of said power series.

7. Apparatus for electrically representing a set of simultaneous equations, one of which involves a non-linear unilateral term which term is expressable in at least two terms of a power series comprising, in combination, a first circuit including electrical elements representing term by term the equation without the non-linear unilateral term, a second circuit including electrical elements representing term by term the equation having the non-linear unilateral term excepting the non-linear unilateral term, circuit means for producing a current in said first circuit, circuit means for producing a current in said second circuit, a first electrical voltage producing device having its input electrically connected to said impedance means and its output electrically connected in said second circuit for producing a voltage in said second circuit corresponding to the first term of said power series, and a second electrical voltage producing device having its input electrically connected to said impedance means and its output electrically connected in said second circuit for producing a voltage in said second circuit corresponding to the second term of said power series.

8. Apparatus for producing an electrical quantity representative of a non-linear unilateral term of a pair of simultaneous equations, said term being expressable in at least two terms of a power series, said apparatus comprising, a first circuit electrically representing term by term the terms of the equation without the non-linear unilateral term, means for producing a current in said first circuit, first circuit means responsive to the current in said first circuit for producing a voltage corresponding to the first term of said power series, second circuit means responsive to the current in said first circuit for producing a voltage corresponding to the second term of said power series, and an electrical circuit for combining said voltages for producing a voltage representative of said non-linear unilateral term.

GILBERT D. McCANN.

REFERENCES CITED

The following references are of record in the file of this patent:

UNITED STATES PATENTS

| Number | Name | Date |
|---|---|---|
| 1,315,539 | Carson | Sept. 9, 1919 |
| 2,128,257 | Lee et al. | Aug. 30, 1938 |
| 2,233,415 | Hull | Mar. 4, 1941 |
| 2,244,369 | Martin | June 3, 1941 |
| 2,414,819 | Lakatos | Jan. 28, 1947 |
| 2,448,698 | Biot | Sept. 7, 1948 |
| 2,459,106 | Hardy | Jan. 11, 1949 |

OTHER REFERENCES

An Electro-Mechanical Method for Solving Equations by A. H. Schooley, RCA Review, vol. III, No. 1, July 1938, published by RCA Institute Technical Press, New York, N. Y., pages 86–96.